US009866383B2

(12) United States Patent
Reddy et al.

(10) Patent No.: US 9,866,383 B2
(45) Date of Patent: Jan. 9, 2018

(54) KEY MANAGEMENT FOR PRIVACY-ENSURED CONFERENCING

(71) Applicant: Cisco Technology, Inc., San Jose, CA (US)

(72) Inventors: K. Tirumaleswar Reddy, Bangalore (IN); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/925,033

(22) Filed: Oct. 28, 2015

(65) Prior Publication Data

US 2017/0126406 A1     May 4, 2017

(51) Int. Cl.
*H04L 9/32* (2006.01)
*H04L 9/30* (2006.01)
*H04W 12/04* (2009.01)

(52) U.S. Cl.
CPC .............. *H04L 9/3066* (2013.01); *H04L 9/30* (2013.01); *H04W 12/04* (2013.01)

(58) Field of Classification Search
CPC ......... H04L 9/30; H04L 9/3066; H04W 12/04
USPC ................................................. 713/171–174
See application file for complete search history.

(56) References Cited

U.S. PATENT DOCUMENTS

| 8,117,446 | B2 | 2/2012 | Dorfman |
| 8,223,673 | B2 | 7/2012 | Miriyala et al. |
| 8,503,681 | B1 | 8/2013 | McGrew et al. |
| 9,306,753 | B1* | 4/2016 | Vandervort ........... H04L 9/3247 |
| 2003/0135464 | A1* | 7/2003 | Mourad .............. G06F 17/3089 705/50 |
| 2005/0204038 | A1* | 9/2005 | Medvinsky ............. G06F 21/10 709/225 |
| 2008/0037047 | A1* | 2/2008 | Condon ................ G06F 17/211 358/1.13 |
| 2009/0216837 | A1* | 8/2009 | Rao ....................... G06Q 10/109 709/204 |
| 2011/0131406 | A1* | 6/2011 | Jones .................. H04L 65/1053 713/150 |
| 2011/0143757 | A1* | 6/2011 | Oh .......................... H04W 4/08 455/435.2 |

(Continued)

OTHER PUBLICATIONS

Yan et al., "An approach of secure and fashionable recognition for pervasive face-to-face social communications," 2012 IEEE 8th International Conference on Wireless and Mobile Computing, Networking and Communications (WiMob) Year: 2012 pp. 853-860.*

(Continued)

*Primary Examiner* — Roderick Tolentino
(74) *Attorney, Agent, or Firm* — Parker Ibrahim & Berg LLC; James M. Behmke; Stephen D. LeBarron

(57) ABSTRACT

In one embodiment, a device in a network establishes a trust relationship between the device and a key management service. The device receives keying information from the key management service based on the established trust relationship. The device applies a digital signature to media data for a conference using the keying information, whereby the device is designated as a speaker of the conference. The device provides the signed media data to one or more conference participant devices. The one or more conference participant devices use the signed media data to validate that the media data was signed by the designated speaker of the conference.

18 Claims, 12 Drawing Sheets

(56) References Cited

U.S. PATENT DOCUMENTS

| | | | | |
|---|---|---|---|---|
| 2013/0061035 A1* | 3/2013 | Hook | ...................... | H04L 9/088 |
| | | | | 713/150 |
| 2013/0101121 A1* | 4/2013 | Nordholt | ............... | H04L 9/0852 |
| | | | | 380/279 |
| 2015/0264103 A1* | 9/2015 | Kim | ...................... | H04L 65/608 |
| | | | | 709/219 |

OTHER PUBLICATIONS

Liu et al., "Rights Sharing Scheme for Online DRM System Using Digital Ticket" 2009 International Conference on Management and Service Science Year: 2009 pp. 1-6.*

Baugher et al. "The Secure Real-time Transport Protocol (SRTP)", Network Working Group, Request for Comments 3711, Mar. 2004, 56 pages, The Internet Society.

Baugher et al. "The Use of TESLA in SRTP", MSEC Working Group, draft-ietf-msec-srtp-tesla-05.txt, Oct. 2005, 18 pages, The Internet Society.

Cheng et al. "Secure Real-time Transport Protocol (SRTP) for Cloud Services", Network Working Group, draft-cheng-avtcore-srtp-cloud-00, Mar. 9, 2015, 28 pages, The Internet Engineering Task Force Trust.

Jones et al. "A Solution Framework for Private Media in a Switched Conferencing", Network Working Group, draft-jones-avtcore-private-media-framework-00, Nov. 10, 2014, 19 pages, The Internet Engineering Task Force Trust.

Jones et al. "Requirements for Private Media in a Switched Conferencing Environment", Network Working Group, draft-jones-avtcore-private-media-reqts-01, Mar. 7, 2015, 19 pages, The Internet Engineering Task Force Trust.

Mattsson et al. "Encrypted Key Transport for Secure RTP", AVTCORE Working Group, draft-ietf-avtcore-srtp-ekt-03, Oct. 20, 2014, 45 pages, The Internet Engineering Task Force Trust.

Baugher et al. "The Use of Timed Efficient Stream Loss-Tolerant Authentication (TESLA) in the Secure Real-time Transport Protocol (SRTP)"; Royal Institute of Technology; Feb. 2006; pp. 1-18.

B. Weis "The Use of RSA/SHA-1 Signatures within Encapsulating Security Payload (ESP) and Authentication Header (AH)" Cisco Systems; Jan. 2006; pp. 1-12.

Westerlund et al. "RTP Topologies draft-ietf-avtcore-rtp-topologies-update-10" Network Working Group; Jul. 2, 2015; pp. 1-46.

Westerlund et al. "WebRTC Use Case and Framework for Privacy Enhanced RTP Conferencing (PERC) draft-westerlund-perc-webrtc-use-case-00" Network Working Group; Jul. 6, 2015; pp. 1-14.

Mattsson "IETF 92 AVTCORE DRAFT-ietf-avtcore-srtp-ekt" Ericsson Research; pp. 1-7.

* cited by examiner

KEY MANAGEMENT FOR PRIVACY-ENSURED CONFERENCING

TECHNICAL FIELD

The present disclosure relates generally to computer networks, and, more particularly, to key management techniques for privacy-ensured conferencing.

BACKGROUND

Switched conferencing presents a promising technique to facilitate the distribution of real-time media flows between two or more endpoint devices. Such media may include, for example, audio, video, text (e.g., via a messenger function), combinations thereof, or the like. In prior techniques, a centralized conference server may be employed to collect and aggregate the various media flows before sending the aggregated media to the destinations (e.g., by merging the audio from multiple participants speaking at the same time, etc.). In switched conferencing, however, the conference server makes no alterations to the actual media itself, but simply forwards the media to the conference participants. By simplifying the functions of the conference server, switched conferencing is well suited to be implemented in a cloud-based environment.

While switched conferencing presents significant simplifications to the infrastructure needed to conduct a real-time conference between distributed devices, privacy and security remain a concern, particularly in the context of cloud-based implementations. Notably, shifting to a cloud-based conferencing system means that, typically, an organization will no longer have access to the physical conference server and the conference server will no longer be located behind the organization's firewalls. To ensure both privacy and security, switched conferencing approaches employ the use of two secrets that are shared between the conference participants and are kept hidden from the conference server and outsiders: 1.) media encryption keys used to encrypt/decrypt the media data payloads and 2.) hash keys used for authentication. However, since every conference participant knows both of these secrets, this also gives rise to the possibility of a conference participant impersonating a conference speaker during the conference.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network establishes a trust relationship between the device and a key management service. The device receives keying information from the key management service based on the established trust relationship. The device applies a digital signature to media data for a conference using the keying information, whereby the device is designated as a speaker of the conference. The device provides the signed media data to one or more conference participant devices. The one or more conference participant devices use the signed media data to validate that the media data was signed by the designated speaker of the conference.

In further embodiments, a device in a network receives media data for a conference that is signed by a sender of the media data. The device extracts ticket information from the received media data. The device provides the extracted ticket information to a key management service to determine whether the sender of the media data is a designated speaker of the conference. The device receives validation information from the key management service to validate whether the sender of the media data is the designated speaker of the conference.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
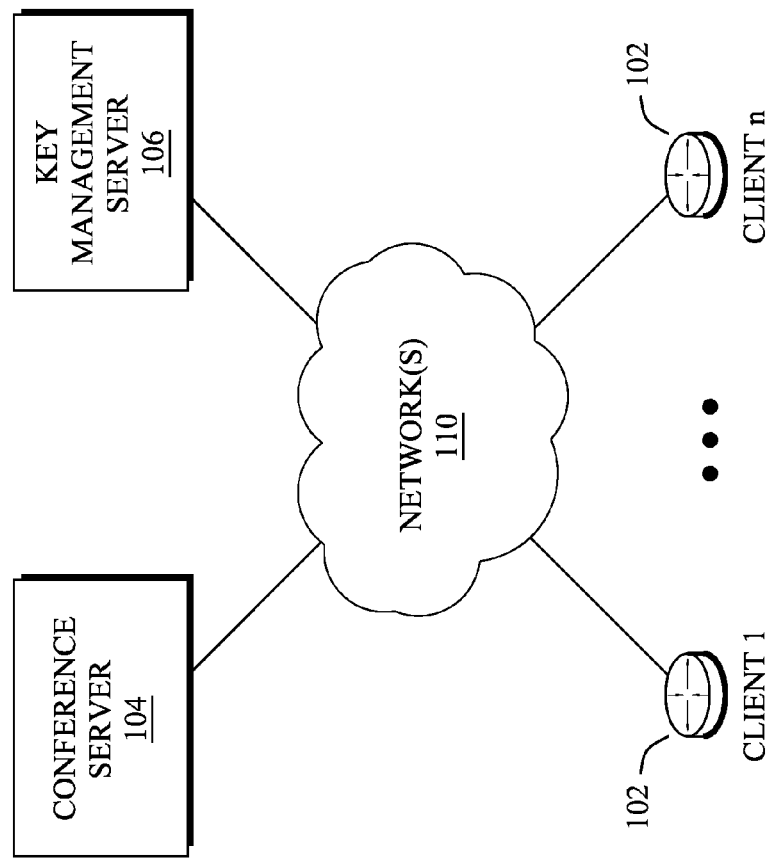
FIG. 1 illustrates an example computing system.

FIG. 1 is a schematic block diagram of an example computing system 100 illustratively comprising any number of client devices 102 (e.g., a first through nth client device), a conference server 104, and a key management service 106 in communication with one another via any number of networks 110. The one or more networks 110 may include, as would be appreciated, any number of specialized networking devices such as routers, switches, access points, etc., interconnected via wired and/or wireless connections. For example, devices 102-106 and/or the intermediary devices in network(s) 110 may communicate wireless sly via links based on WiFi, cellular, infrared, radio, near-field communication, satellite, or the like. Other such connections may use hardwired links, e.g., Ethernet, fiber optic, PLC, etc.

Client devices 102 may include any number of user devices configured to participate in a real-time conference in which media data is exchanged between the participating devices (e.g., audio, video, text, etc.). For example, client devices 102 may include, but are not limited to, desktop computers, laptop computers, tablet devices, smart phones, wearable devices (e.g., heads up devices, smart watches, etc.), set-top devices, smart televisions, or any other form of computing device capable of participating in a real-time conference via network(s) 110.

Conference server 104 may be configured to facilitate a conference between any number of client devices 102. In some embodiments, conference server 104 may be a switched conference server and selectively forward only a subset of the media data to the participants. For example, conference server 104 may be configured to reduce the consumption of bandwidth and other resources by forwarding only a subset of the media data/flows to the conference participants. In some embodiments, conference server 104 may be part of a cloud-based service. In such cases, conference server 104 may represent the cloud-based device(s) that provide the conferencing services described herein with respect to conference server 104.

Key management server 106 may be configured to provide key management services to client devices 102. In various embodiments, key management server 106 may be part of a public key infrastructure and be operable to generate and provide encryption keys to client devices 102 for use during a conference. For example, as described in greater detail below, client devices 102 may interact with key management server 106, to ensure the privacy and security of the media data exchanged between client devices 102 during a real-time conference.

Those skilled in the art will understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Figure 2:
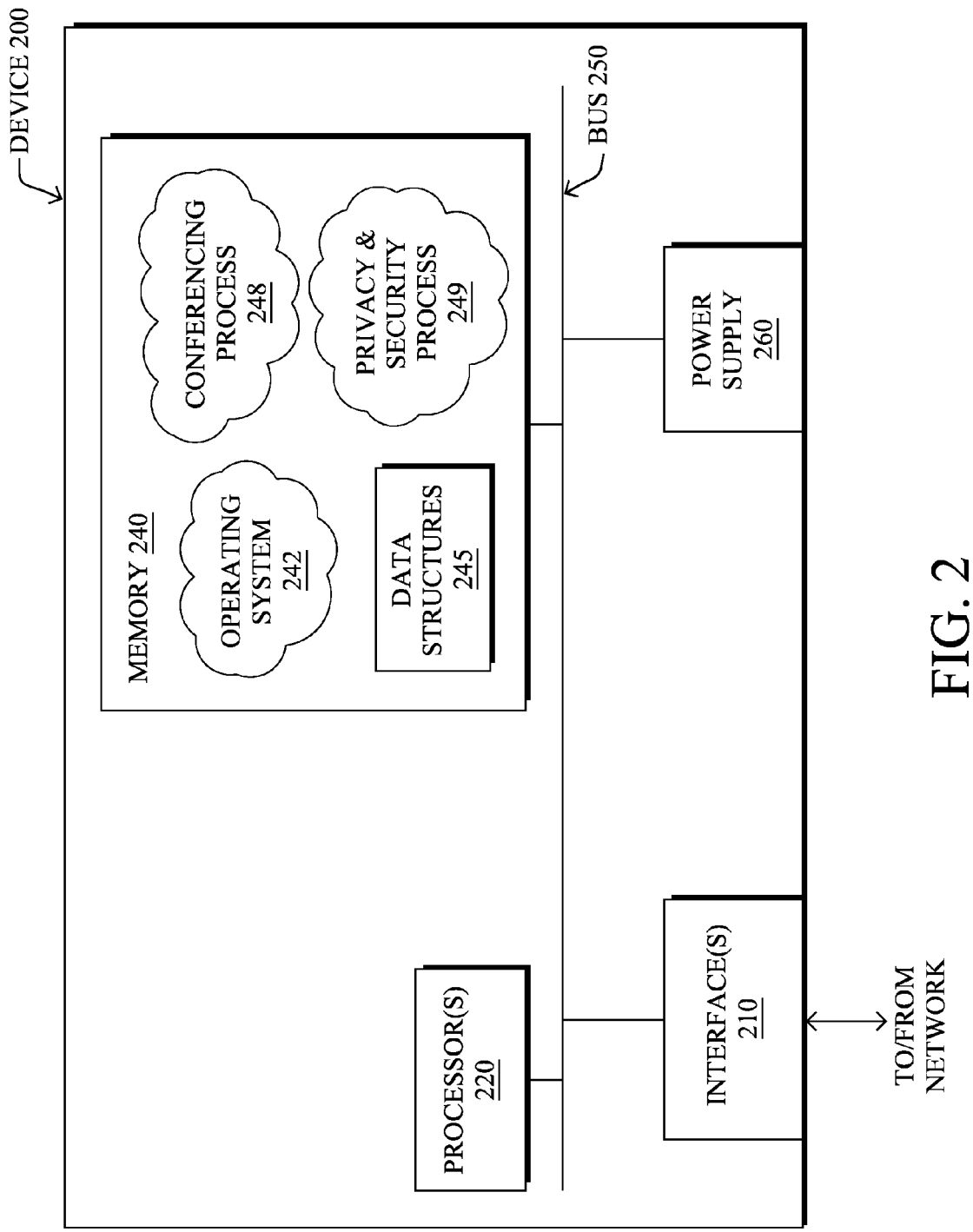
FIG. 2 illustrates an example network device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a conferencing process 248 and/or a privacy & security process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Generally, conferencing process 248, when executed by processor(s) 220 may be configured to enable a real-time conference between any number of devices participating in the conference. For example, when executed by a conference participant, conferencing process 248 may be operable to send media data generated by local device 200 (e.g., audio, video, etc.) to any or all of the other conference participant devices (e.g., via a conference server). Similarly, when media data is received from another conference participant, conferencing process 248 may be operable to process the received data and/or present the media data to a user via a user interface (e.g., a display, speaker, etc.). In some embodiments, conferencing process 248 may be configured to facilitate a switched conference whereby the media data is conveyed via Real-Time Protocol (RTP) packets.

Privacy & security process 249, when executed by processor(s) 220, may be configured to provide privacy and security functions to a real-time conference managed by conferencing process 248. For example, processes 248-249 may be configured to collaboratively encrypt/decrypt the media data conveyed during the conference in the payloads of the RTP packets. In various embodiments, processes 248-249 may do so using Secure RTP (SRTP) packets, as described in the Internet Engineering Task Force (IETF) Request for Comments (RFC) 3711 entitled "The Secure Real-time Transport Protocol (SRTP)," by Baugher et al. Further IETF documents that describe methodologies that may be used by processes 248-249 to provide privacy and security in a switched conferencing system using SRTP packets include the IETF drafts "A Solution Framework for Private Media in a Switched Conferencing," by Jones et. al. and "Secure Real-time Transport Protocol (SRTP) for Cloud Services," by Cheng et al.

In some embodiments, processes 248-249 may implement the Encrypted Key Transport (EKT) framework for SRTP, as proposed in the IETF Draft entitled "Encrypted Key Transport for Secure RTP," by Mattsson et al. Briefly, such a framework extends SRTP by adding an EKT field to packets. This field is used to convey an SRTP master key to the conference endpoints and is encrypted using a key encrypting key, also referred to as an EKT key. This SRTP master key can then be used by the endpoints to decrypt the media data in the payload of the packet.

As noted above, efforts to add privacy and security to cloud-based conferencing systems have focused on the conference participants sharing the same secrets used for media encryption and authentication. However, doing so also gives rise to the possibility of a conference participant using the shared information to impersonate another speaker. For example, a malicious participant may use the authentication credentials of another participant, to mislabel media data as being sent by the other participant.

Key Management for Privacy-Ensured Conferencing

The techniques herein provide for the authentication of an originator of media data sent within a conferencing system, while supporting end-to-end encryption of the media content. In some aspects, a key management service (KMS) may be employed to validate that the sender of a packet carrying conferencing media data is also a designated speaker in the conference. For example, the KMS may use asymmetric key authentication, to confirm to the conference participants that any received media data was indeed sent by the actual conference speaker.

Specifically, according to one or more embodiments of the disclosure as described in detail below, a device in a network establishes a trust relationship between the device and a key management service. The device receives keying information from the key management service based on the established trust relationship. The device applies a digital signature to media data for a conference using the keying information, whereby the device is designated as a speaker of the conference. The device provides the signed media data to one or more conference participant devices. The one or more conference participant devices use the signed media data to validate that the media data was signed by the designated speaker of the conference.

Illustratively, the techniques described herein may be performed by hardware, software, and/or firmware, such as in accordance with processes 248-249, which may contain computer executable instructions executed by the processor 220 (or by an independent processor of network interfaces 210), to perform functions relating to the techniques described herein. For example, the techniques herein may be treated as extensions to conventional protocols, such as the various switched conferencing protocols or privacy and security protocols, and as such, may be processed by similar components understood in the art that execute those protocols, accordingly.

Operationally, media data sent by a participant in a switched conference may be digitally signed by its sender using a (short-term) private key received from a KMS or using the participant's own private key. In turn, the other conference participants that receive the signed media data may use a corresponding public key received from the KMS, to ensure that the sender of the media data is indeed the conference speaker. Said differently, the participants in the conference may not share any credentials with one another, but instead employ the use of a trusted third party (e.g., the KMS), with which the participants can establish shared credentials. Pre-established trust relations can be used to create a security association between participants in the conference. Examples of a conference being conducted in the communication system 100 of FIG. 1 are illustrated in FIGS. 3A-3H, according to various embodiments.

Figure 3A:
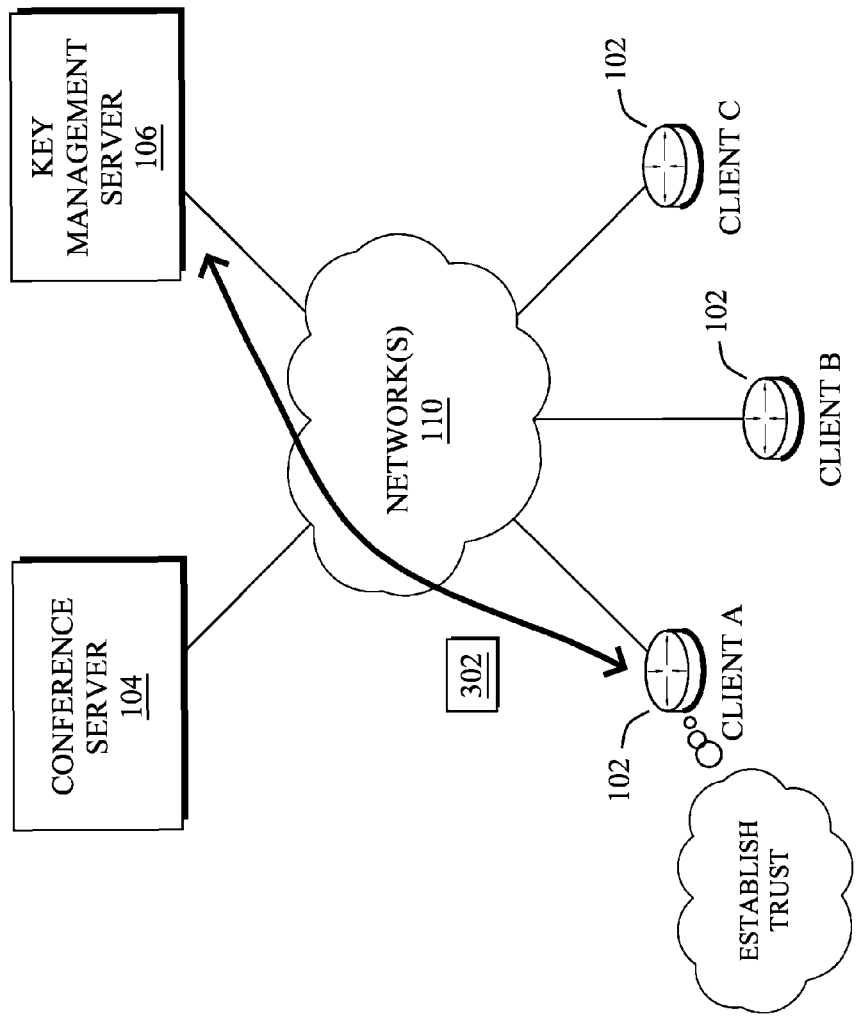
FIGS. 3A-3H illustrate examples of a conference being conducted in the communication system of FIG. 1.

As shown in FIG. 3A, assume that a conference is held between client devices A, B, and C. Also, for purposes of illustration, assume that client device A is designated as the speaker of the conference. In some embodiments, client device A may establish a trust relationship with the KMS, key management server 106, by exchanging data 302 that establishes the identity of client device A to the KMS. For example, data 302 may include information regarding the IP address of client device A, an organization associated with client device A (e.g., a business, school, etc.), personal contact information for a user or administrator associated with client device A, or any other information that may be exchanged to establish a trust relationship between client device A and key management server 106.

As would be appreciated, computing system 100 shown is illustrative only and may include any number of different intermediary devices. For example, in some embodiments, conference server 104 may be operable to handle all exchanges of media during a conference. However, in other embodiments, conference server 104 may provide only the signaling used to perform a conference, while any number of other intermediary nodes (e.g., in network 110) may handle the forwarding of the actual media. For example, as described in the IETF draft "RTP Topologies," by Westerlund, et al., an intermediate device in network 110 may act as a relay, media switching mixer, or selective forwarding middlebox, in various embodiments.

Figure 3B:
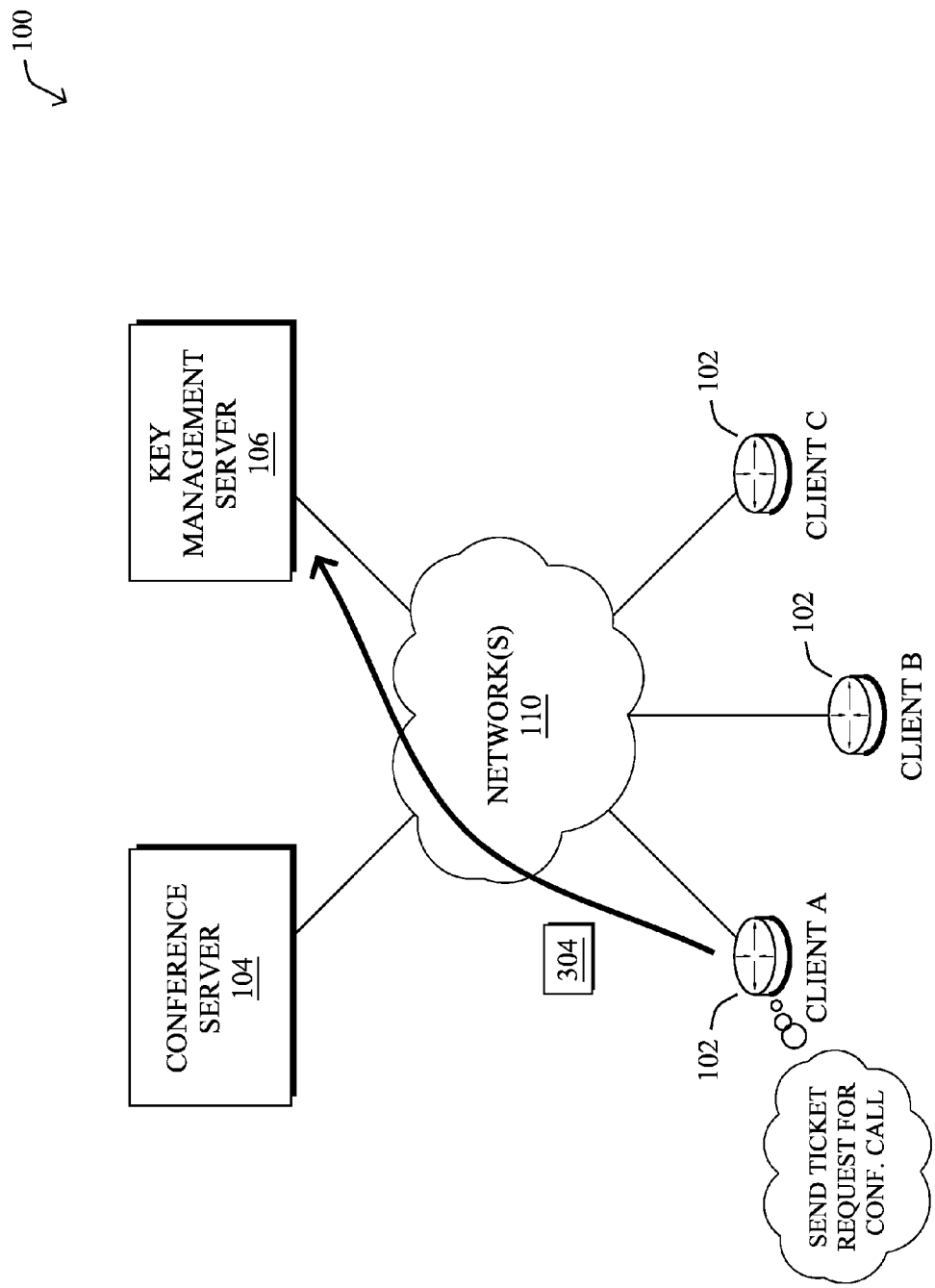

As shown in FIG. 3B, once a trust relationship has been established between a conference speaker and the KMS, the speaker may send a conference ticket request to the KMS. For example, client device A may send request 304 to key management server 106 that requests a ticket and keying information (e.g., short-term public and private keys) for a conference facilitated by conference server 104. In some cases, request 304 may also identify the conference participants authorized to receive the keying information associated with the ticket, such as clients B and C. For example, each conference participant may be referenced using an identifier that is unique within a conference. In further embodiments, client device A may generate its own public and private keys in anticipation of being the conference speaker, and provide the generated public key to the KMS for distribution to the conference participants.

Figure 3C:
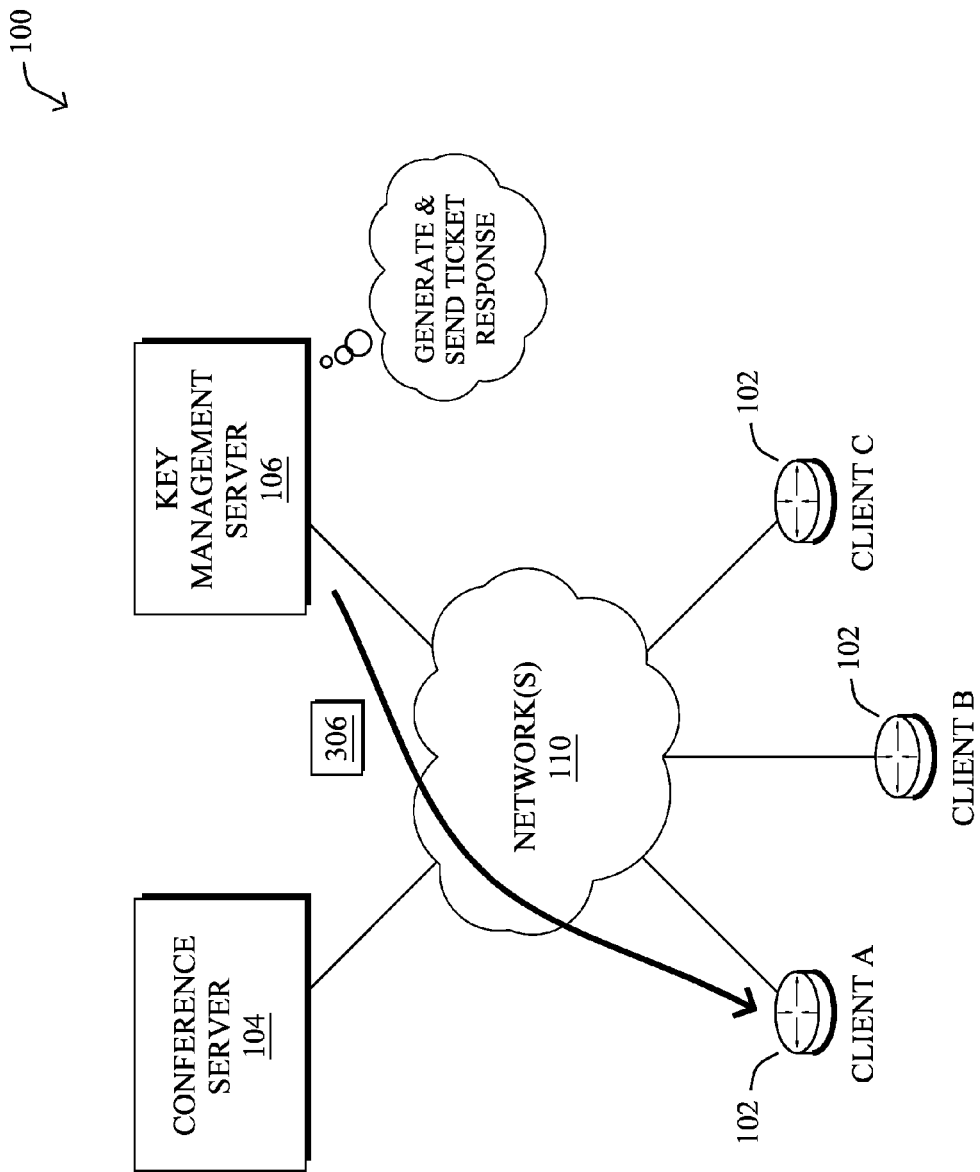

As shown in FIG. 3C, if the KMS determines that the speaker is authorized (e.g., based on the pre-established trust relationship with the KMS), the KMS may generate and send a ticket response 306 back to the requesting client device A. In various embodiments, ticket response 306 may include any or all of the following information: an EKT key, cipher suite information, and asymmetric keying information associated with the issued ticket. For example, the keying information may include elliptic curve short term public and private keys generated by the KMS. In other embodiments, the keying information may include Rivest-Shamir-Adleman (RSA) keying information or keying information from another digital signature mechanism. However, as would be appreciated, the use of RSA-based signatures may increase the packet size of an SRTP packet more than if an Elliptic Curve Digital Signature Algorithm (ECDSA) is used.

Figure 3D:
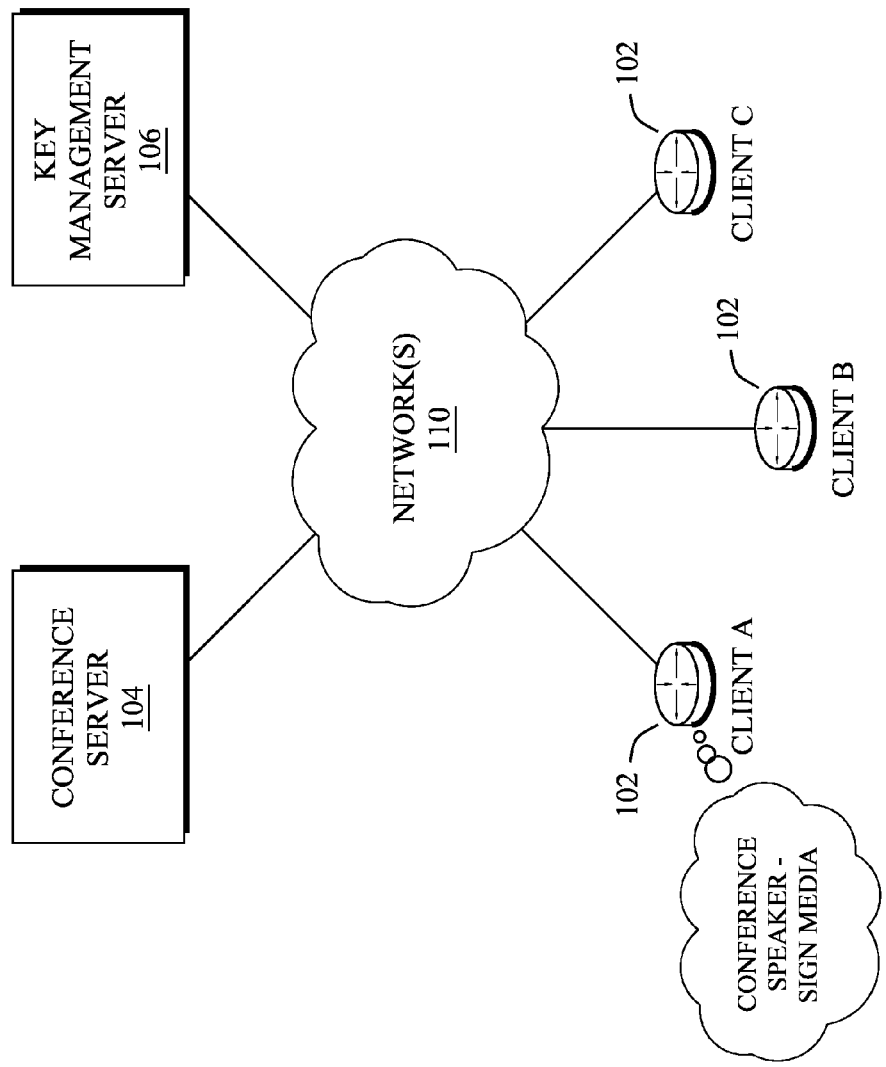
Figure 3E:
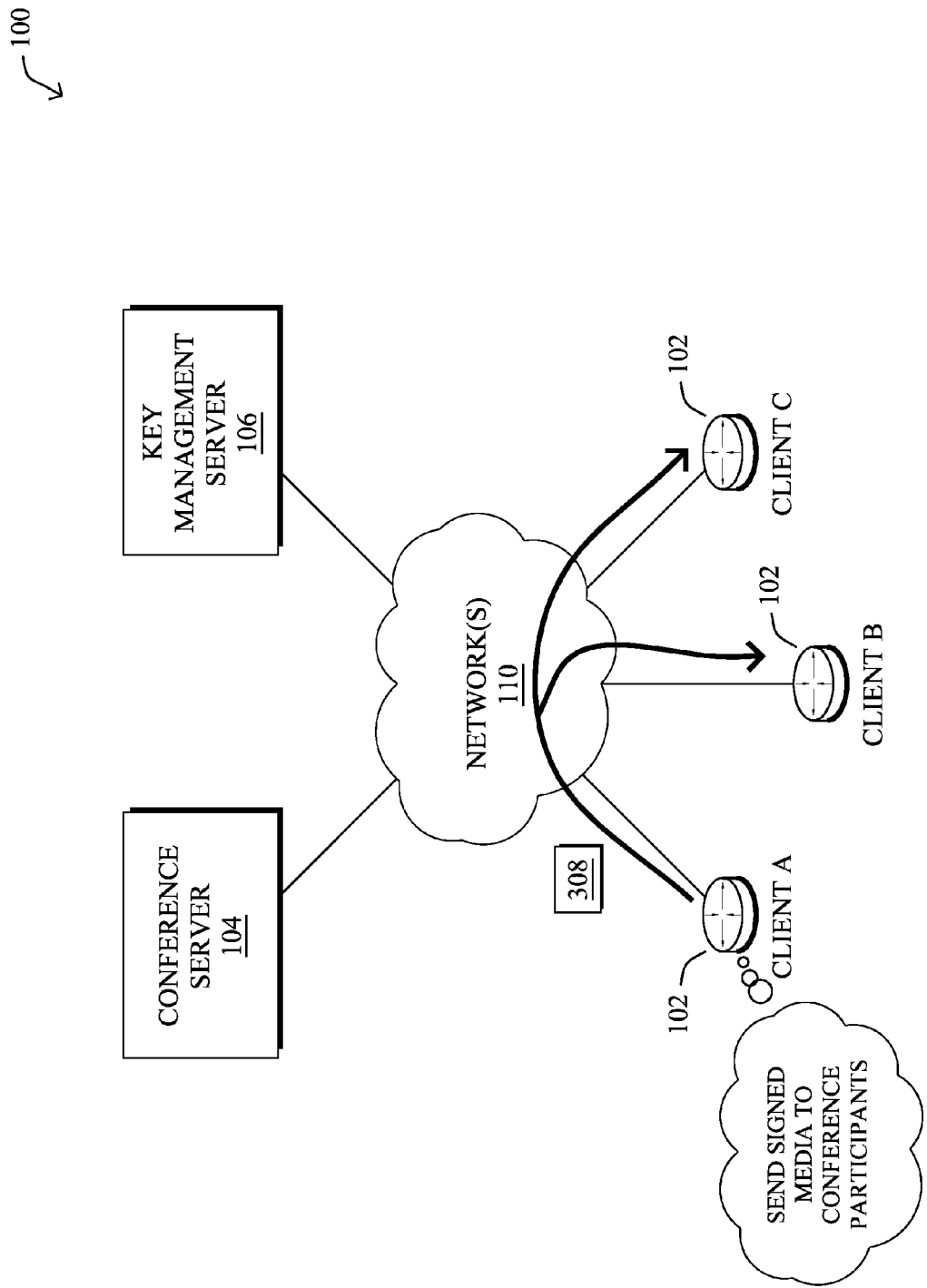

As shown in FIG. 3D, the conference speaker may include the ticket information received from the KMS in the sent conference media and sign the packets using the keying information provided by the KMS. For example, as shown in FIG. 3E, speaker/client device A may send a media packet 308 to the other conference participants that includes the information needed by the participants to validate that client device A is indeed the speaker of the conference. In some embodiments, speaker/client device A may include the issued ticket in an EKT field appended to the SRTP payload of packet 308. Further, client device A may encrypt the media content of packet 308 using an SRTP master key signaled in the appended EKT field. This master key may be used later on by participants/client devices B and C to decrypt the media payload of packet 308. The SRTP master key may also be encrypted using an EKT key (e.g., a key-encrypting-key). Further, speaker/client device A may use the keying information issued by the KMS to digitally sign packet 308, prior to sending to the other conference participants.

Figure 3F:
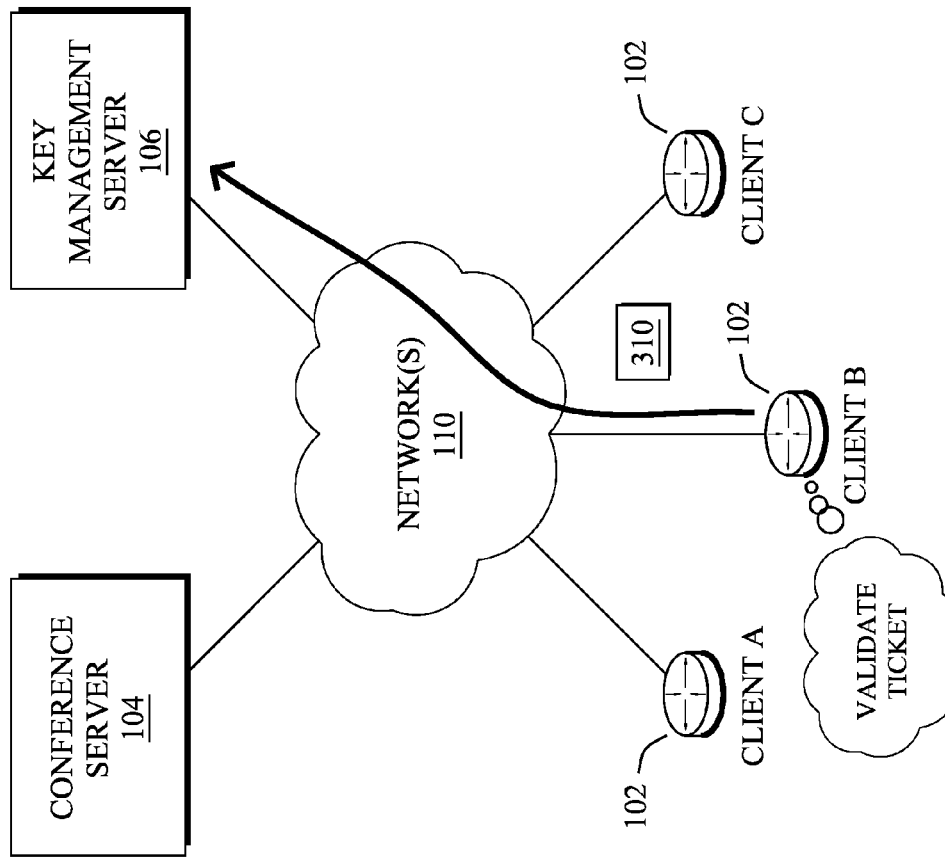

As shown in FIG. 3F, a conference participant may send a validation request 310 to the KMS, in response to receiving media data packet 308. For example, participant/client device B may extract the ticket included in data packet 308 and forward the ticket to key management server 106, to validate that the sender of packet 308 is indeed the conference speaker. Validation request 310 may further include information regarding the identity of the participant/client device B.

Figure 3G:
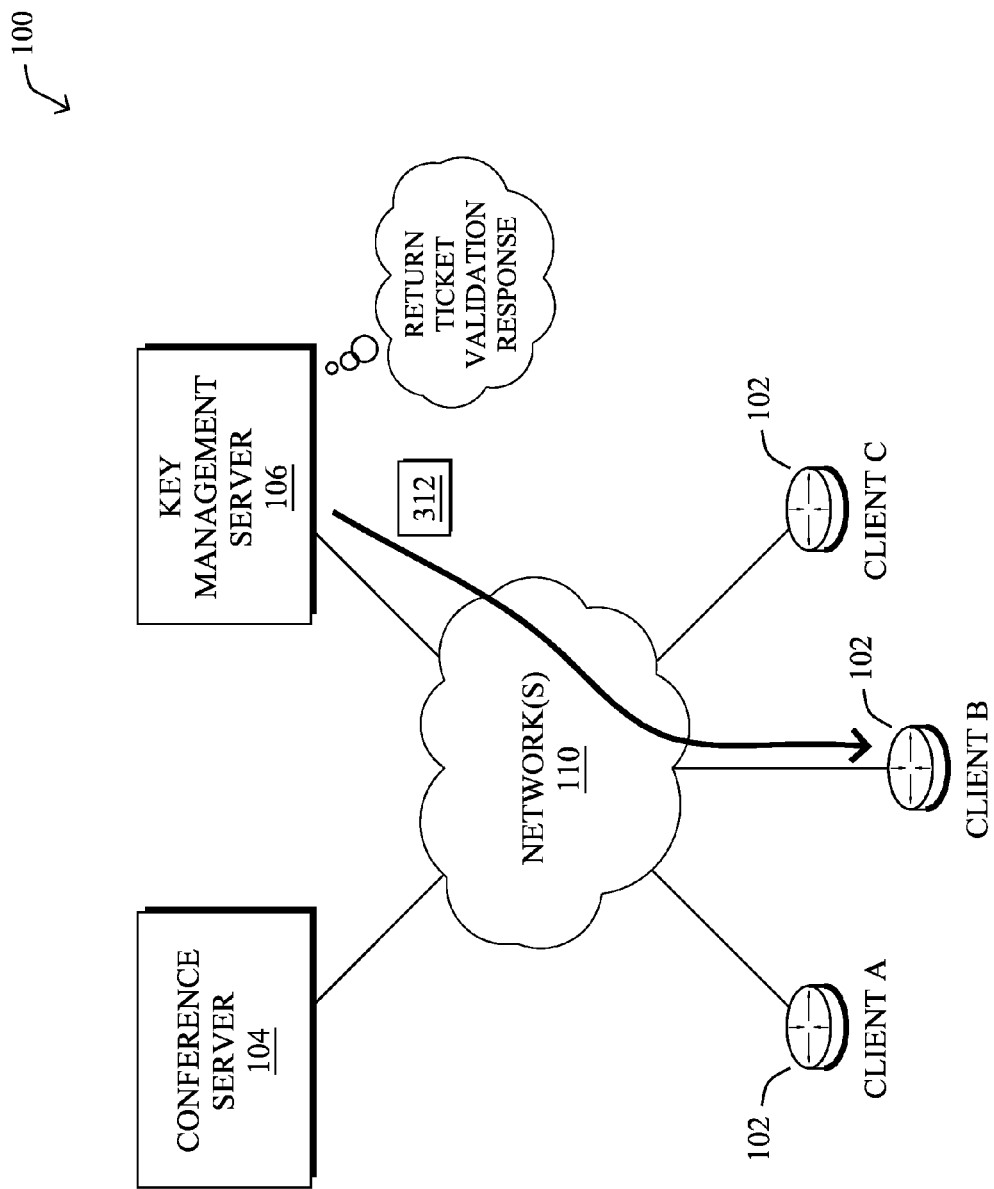

As shown in FIG. 3G, in response to receiving validation request 310, the KMS may determine 1.) whether participant/client device B was previously authorized as a conference participant (e.g., via ticket request 304 send by speaker device A, previously), and/or 2.) whether the request 310 is valid.

Based on the analysis of validation request 310, key management server 106 may send a ticket validation response 312 back to the requesting participant device, client device B. Generally, ticket validation response 312 may indicate whether the sender of media data packet 308 is indeed the designated and authorized conference speaker. In some embodiments, if the sender is determined to be the speaker, ticket validation response 312 may include the keying information associated with the ticket and/or the identity of the ticket issuer. For example, if the conference participant is an authorized participant and the ticket forwarded to the KMS was issued to the conference speaker, key management server 106 may also include any or all of the following in ticket validation response 312: the EKT key, data identifying the designated conference speaker, cipher suite associated with the ticket, and the corresponding keying information (e.g., elliptic curve short-term public keys, etc.) that correspond to the private key(s) used by the conference speaker.

Figure 3H:
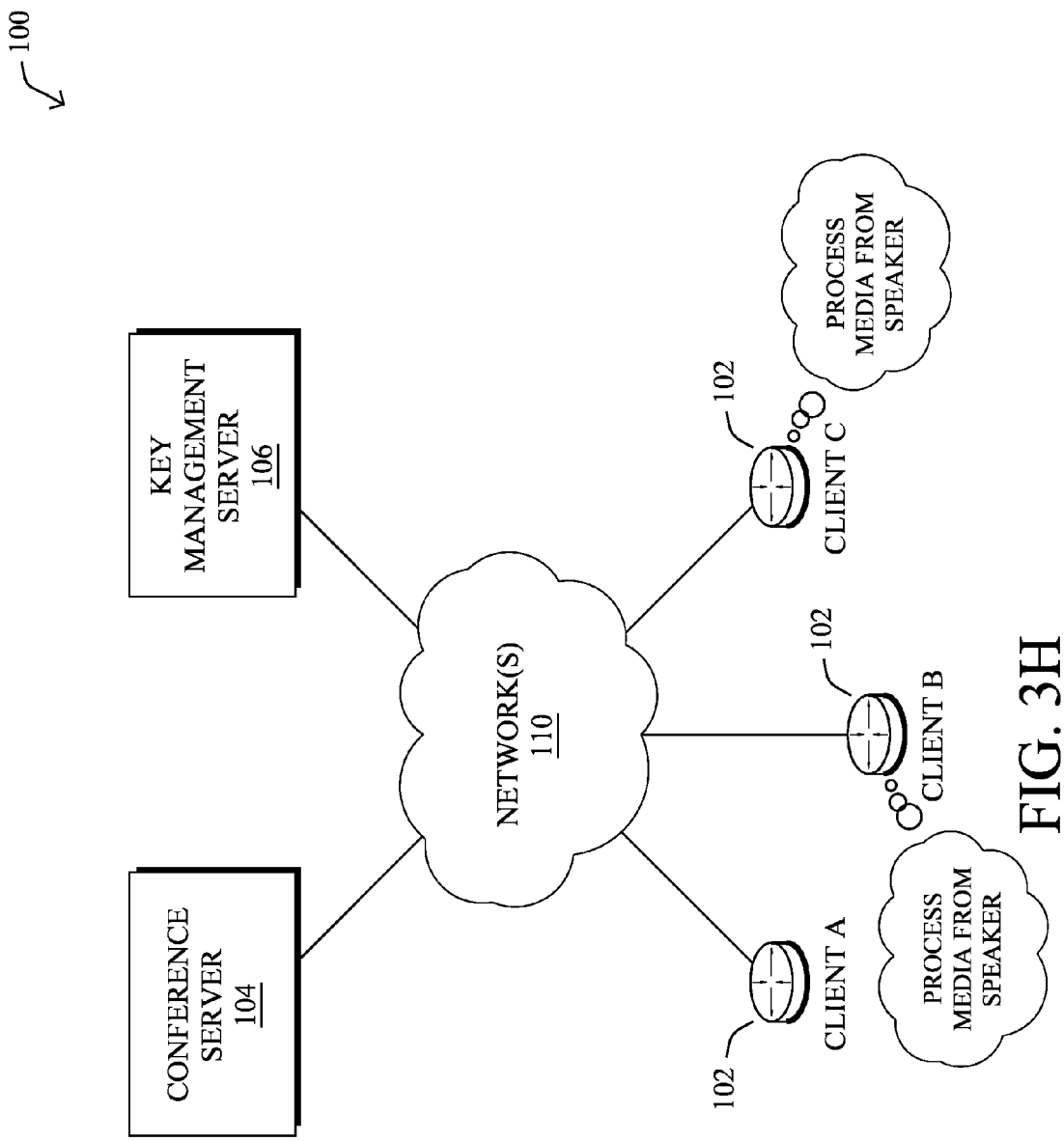

As shown in FIG. 3H, the conference participants may use the information in validation responses 312 from the KMS, to validate the sender of the packets as the conference speaker and process the media data. For example, a participant may use the EKT key returned in response 312 to decrypt the EKT ciphertext in the EKT field of the media data packet. In turn, the participant may use the SRTP master key in the EKT field to decrypt the media content payload of the packet.

In various embodiments, the conference participant may also use the keying information included in response 312 from the KMS (e.g., the elliptic curve short-term public keying information, etc.), to validate the digital signature of the media data packet, thereby ensuring that the particular packet was indeed sent by the conference speaker. The decrypted and validated media content may then be presented by the participant device to the corresponding user, as appropriate (e.g., by providing the content to a display, speaker, etc.). However, if a conference participant receives a packet that was sent by a device other than the authorized conference speaker, the participant device may take any number of corrective measures such as dropping the packet, raising an alert, or the like.

Various approaches may be taken to reduce the impact the techniques herein have on the resources of the conferencing system. For example, as would be appreciated, the techniques herein may require the KMS to distribute many public/private keys very quickly. Thus, in some embodiments, the KMS may be further configured to maintain a cache of pre-calculated keys and/or dynamically adjust its key-generation resources, to accommodate a large number of requests. In another example, to reduce the computational burden of doing a public key operation on every SRTP packet for both the sender and all receivers, a signature may be generated only for a subset of packets, appropriately signaled during setup of the conference. For example, a public key signature may be generated on video I-frames, on every other RTP sequence number, or the like.

Figure 4:
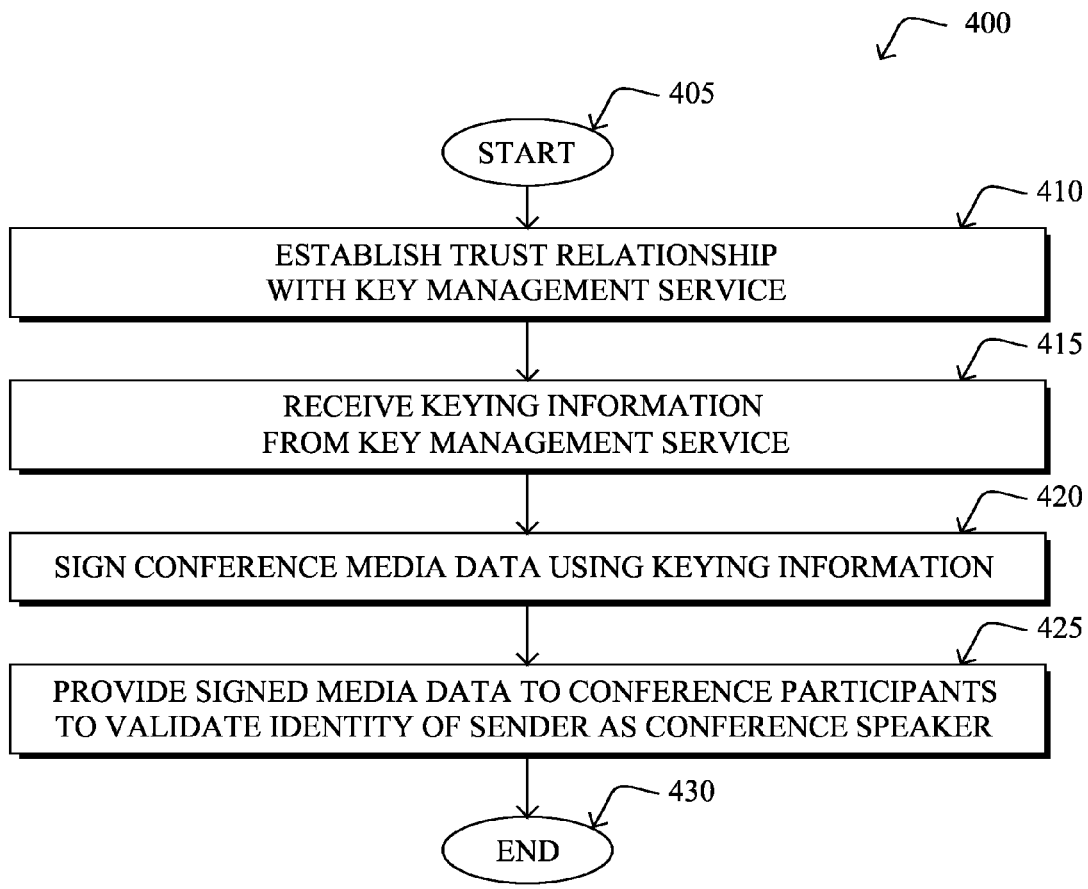
FIG. 4 illustrates an example simplified procedure for sending signed media data in a conference.

FIG. 4 illustrates an example simplified procedure for sending signed media data in a conference, in accordance with one or more embodiments described herein. The procedure 400 may start at step 405 and continue on to step 410 where, as described in greater detail above, a device in a network may establish a trust relationship with a key management service (KMS). For example, the device may exchange information with the KMS that may be used to confirm the identity of the device. The identity may be associated, for instance, with an email address (e.g., username@domain, etc.) or other identifier, to ensure that the device is being operated by a specific user.

At step 415, as detailed above, the device may receive keying information from the KMS. In one embodiment, when the device is to act as a speaker in a conference, the device may send a ticket request to the KMS and receive keying information in response to be used to sign media sent by the device as the speaker of the conference. This request may also identify the conference participants, thereby allowing the KMS to ensure that any subsequent validation requests regarding the identity of the speaker are sent by authorized conference participants. The received signature information may include, for example, a ticket issued by the KMS for the particular conference and/or keying information that may be used to digitally sign media data packets sent by the device during the conference. In various embodiments, this keying information may be elliptic curve keys, RSA signature keys, or any other form of key that may be used to digitally sign conference media packets. In some embodiments, the keys generated by the KMS may be of limited duration and only be valid for the particular conference.

At step 420, the device may apply a digital signature to media data generated by the device as the designated speaker of the conference, as described in greater detail above. In particular, the device may use the keying information (e.g., a short-term private key) received from the KMS to sign the media data packet, prior to sending the packet to the conference participant devices. For example, in some cases, the device may use an SRTP master key to encrypt the media data in the payload of the packet, encrypt this key using an EKT key received from the KMS, include the ticket previously issued by the KMS in the packet, and sign the packet using the received keying information (e.g., the elliptic curve keying information, etc.).

At step 425, as detailed above, the device may send the signed media data packet to one or more conference participant devices. For example, the device may send the signed media packet to the conference participants via a conference server administering the conference. In turn, the participant devices may use the digital signature in the media data packet to validate that the sender of the packet is indeed the conference speaker. For example, a conference participant may extract the ticket from the packet, forward the ticket to the KMS, and receive the keying information associated with the ticket (e.g., the corresponding public keys), if the participant is an authorized participant in the conference. The participant may then use the returned keying information to validate that the packet was indeed signed by the conference speaker. Procedure 400 then ends at step 430.

Figure 5:
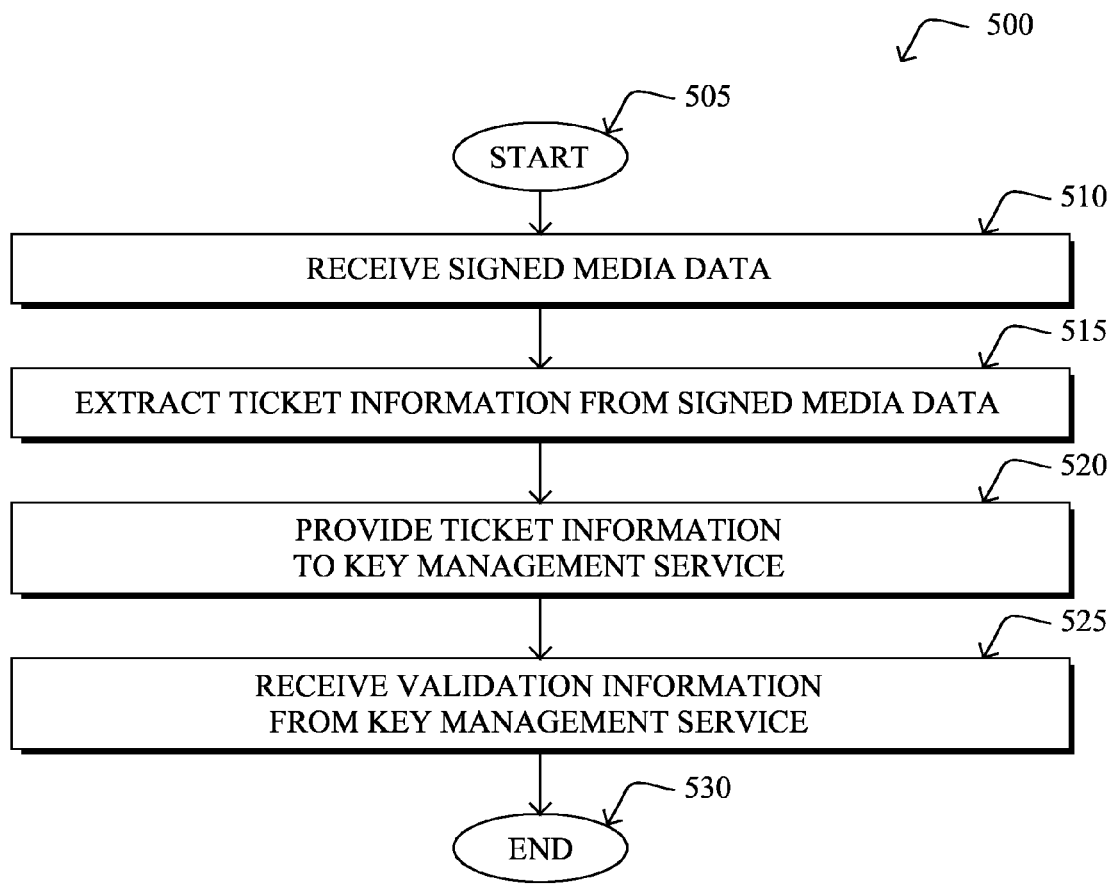
FIG. 5 illustrates an example simplified procedure for validating the identity of the sender of conference media data.

FIG. 5 illustrates an example simplified procedure for validating the identity of the sender of conference media data, in accordance with one or more embodiments described herein. The procedure 500 may being at step 505 and continue on to step 510 where, as described in greater detail above, a device in a network may receive a signed packet that includes media data for a conference in which the device is participating.

At step 515, as detailed above, the device may extract ticket information from the received media data. In one embodiment, the ticket included in the media data may be a ticket issued by a KMS to the sender of the media data packet based on an established trust relationship between the KMS and the sender of the packet. For example, a received media data packet may be an SRTP packet that includes a KMS-issued ticket in the EKT field of the packet.

At step 520, the device may send the ticket information to a KMS, to determine whether the sender of the media data is a designated speaker of the conference, as described in greater detail above. Such a request may also identify the device, to allow the KMS to determine whether the device is an authorized conference participant.

At step 525, as detailed above, the device may receive validation information from the KMS indicative of whether the sender of the media data is the designated speaker of the conference. For example, the KMS may return to the device the keying information associated with the ticket sent to the KMS in step 520 (e.g., the public keying information associated with the signature). This keying information can then be used by the device to validate the digital signature of the media data packet, thereby ensuring that the sender of the packet is also a designated speaker in the conference. Procedure 500 then ends at step 530.

It should be noted that while certain steps within procedures 400-500 may be optional as described above, the steps shown in FIGS. 4-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The techniques described herein, therefore, provide for origination authentication in a conference, to prevent conference participants from impersonating one another. In some aspects, the techniques leverage the use of a KMS, thereby avoiding extending trust to the conference server, which may be of particular use in cloud-based implementations.

While there have been shown and described illustrative embodiments, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of networks and/or protocols (e.g., wireless). The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    establishing, by a device in a network designated as a speaker of a conference, a trust relationship between the device and a key management service by exchanging data establishing the identity of the device;
    sending, by the device, a conference ticket request to the key management service requesting a ticket and keying information for the conference;
    receiving, at the device, an issued ticket and keying information from the key management service based on the established trust relationship;
    applying, by the device, a digital signature to media data provided during the conference using the keying information, wherein the device as the designated speaker of the conference originates the media data and wherein the signed media data includes the issued ticket; and
    providing, by the device, the signed media data to one or more conference participant devices during the conference, wherein the one or more conference participant devices use the signed media data to validate that the media data was signed by the designated speaker of the conference by providing ticket information extracted from the signed media data to the key management service and receiving validation information including the keying information from the key management service validating that the sender of the media data is the designated speaker of the conference and the one or more participant devices are an authorized conference participant.

2. The method as in claim 1, further comprising:
    encrypting, by the device, the signed media data, prior to providing the encrypted and signed media data to the one or more conference participant devices.

3. The method as in claim 1, wherein the media date comprises a particular Secure Real-time Transport Protocol (SRTP) packet.

4. The method as in claim 1, wherein the received keying information comprises a private elliptic curve key that is valid only for use in the conference.

5. The method as in claim 1, further comprising:
    sending, by the device, a request for the keying information to the key management system, wherein the request comprises an indication of the one or more conference participant devices.

6. The method as in claim 1, further comprising:
    generating, by the device, public and private keys to be used by the device to sign media data; and
    providing, by the device, the public key to the key management system.

7. A method, comprising:
    receiving, at a device in a network, media data provided during a conference that is signed by a sender of the media data originated by a designated speaker of the conference using keying information and an issued ticket received by the designated speaker from a key management service based on an established trust relationship between the designated speaker and the key management service, wherein a digital signature is applied to the media data;
    extracting, by the device, ticket information from the received media data;

providing, by the device, the extracted ticket information to the key management service to determine whether the sender of the media data is the designated speaker of the conference; and receiving, at the device, validation information including the keying information from the key management service to validate whether the sender of the media data is the designated speaker of the conference and the device is an authorized conference participant.

8. The method as in claim 7, wherein the media data for the conference comprises a particular Secure Real-time Transport Protocol (SRTP) packet, and wherein an Encrypted Key Transport (EKT) field of the SRTP packet is signed by the sender of the media data.

9. The method as in claim 8, wherein the validation information received from the key management service includes decryption data, the method further comprising:

decrypting the EKT field of the particular SRTP packet to obtain an SRTP master key using the decryption data; and using the SRTP master key to decrypt a payload of the particular packet.

10. The method as in claim 7, wherein the media data for the conference is signed using an elliptic curve private key that is valid only for the conference.

11. The method as in claim 10, further comprising:

receiving, at the device, an elliptic curve public key from the key management service that corresponds to the elliptic curve private key; and using, by the device, the elliptic curve public key to validate whether the sender of the media data is the designated speaker of the conference.

12. The method as in claim 7, wherein the validation information identifies the designated conference speaker.

13. An apparatus, comprising:

one or more network interfaces to communicate with a network; a processor coupled to the network interfaces and configured to execute one or more processes; and a memory configured to store a process executable by the processor, the process when executed configured to:

establish a trust relationship between the device designated as a speaker of a conference and a key management service by exchanging data establishing the identity of the device;

send a conference ticket request to the key management service requesting a ticket and keying information for the conference;

receive an issued ticket and keying information from the key management service based on the established trust relationship;

apply a digital signature to media data provided during the conference using the keying information, wherein the apparatus as the designated speaker of the conference originates the media data and wherein the signed media data includes the issued ticket; and providing the signed media data to one or more conference participant devices during the conference, wherein the one or more conference participant devices use the signed media data to validate that the apparatus is the designated speaker of the conference by providing ticket information extracted from the signed media data to the key management service and receiving validation information including the keying information from the key management service validating that the sender of the media data is the designated speaker of the conference and the one or more participant devices are an authorized conference participant.

14. The apparatus as in claim 13, wherein the media data comprises a particular Secure Real-time Transport Protocol (SRTP) packet.

15. The apparatus as in claim 13, wherein the received keying information comprises a private elliptic curve key that is valid only for use in the conference.

16. The apparatus as in claim 13, wherein the process when executed is further operable to:

encrypt the signed media data, prior to providing the encrypted and signed media data to the one or more conference participant devices.

17. The apparatus as in claim 13, wherein the process when executed is further operable to:

send a request for the keying information to the key management system, wherein the request comprises an indication of the one or more conference participant devices.

18. The apparatus as in claim 13, wherein the process when executed is further operable to:

generate public and private keys to be used by the device to sign media data; and provide the public key to the key management system.

* * * * *

UNITED STATES PATENT AND TRADEMARK OFFICE
CERTIFICATE OF CORRECTION

PATENT NO.        : 9,866,383 B2
APPLICATION NO.   : 14/925033
DATED             : January 9, 2018
INVENTOR(S)       : K. Tirumaleswar Reddy et al.

Page 1 of 1

It is certified that error appears in the above-identified patent and that said Letters Patent is hereby corrected as shown below:

In the Specification

In Column 2, Line 55, please amend as shown:
devices in network(s) 110 may communicate wirelessly via Signed and Sealed this
First Day of December, 2020

Andrei Iancu
*Director of the United States Patent and Trademark Office*